Patented Sept. 6, 1932

1,875,722

UNITED STATES PATENT OFFICE

CHARLES L. GABRIEL, OF TERRE HAUTE, INDIANA, AND BRUCE K. BROWN, OF NEW YORK, N. Y., ASSIGNORS TO COMMERCIAL SOLVENTS CORPORATION, OF TERRE HAUTE, INDIANA, A CORPORATION OF MARYLAND

CATALYST FOR SYNTHETIC METHANOL PRODUCTION

No Drawing. Original application filed August 27, 1925, Serial No. 52,956. Divided and this application filed September 15, 1928. Serial No. 306,287.

Our invention relates to a method of producing catalysts suitable for the catalytic synthesis of methyl alcohol from hydrogen and carbon monoxide or carbon dioxide.

It is well known that methyl alcohol may be catalytically prepared by reacting the above gases at elevated temperatures and pressures in the presence of a proper catalyst. The two chemical reactions which are illustrative of the reaction follow:

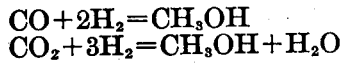

$$CO + 2H_2 = CH_3OH$$
$$CO_2 + 3H_2 = CH_3OH + H_2O$$

Both of these reactions are reversible and take place only at elevated temperatures and pressures.

A very wide variety of substances and mixtures of substances has been proposed as catalysts for the reaction. Some of these catalysts are so easily poisoned and destroyed that they are uneconomical in use. Others are extremely expensive and still others do not produce pure methyl alcohol, but rather a variety of substances including acids and gaseous hydrocarbons such as methane. Still another extensive group of such catalysts consists of those which produce such low conversions as to make them impractical for commercial use.

It is the purpose of our invention and application to provide a workable economical process for the production of methyl alcohol from hydrogen and oxides of carbon and this purpose has been accomplished by the preparation of a novel and efficient catalyst and by the discovery of proper working conditions for the use of this catalyst whereby methyl alcohol may be produced in good yield.

As a catalyst we employ a metallic alloy of zinc and copper in which the copper is present in larger proportion than the zinc. The copper-zinc alloy may also contain a small percentage of another metal such as tin or manganese. The following substances are typical alloys, such as are contemplated for use in our process.

Brass—zinc, 1 part; copper, 2-5 parts
Bronze—zinc, 1-2 parts; copper, 7-9 parts; and tin, 1-2 parts Manganese bronze—which is an ordinary bronze containing about .3% of manganese Before use as catalysts these alloys must be preliminarily activated. This may be accomplished by reducing the alloy to a finely divided condition in the form of filings or turnings, and then subjecting the finely divided material to an oxidizing action. During the oxidation, the surface of the catalyst is rendered irregular and porous. On exposure to a reducing atmosphere, such as hydrogen gas, the oxidized surface is partially reduced to metal and the complex mixture of copper alloy and derived oxides constitutes an active methanol catalyst.

We have now found that a particularly active and efficient form of catalyst of the above type, suitable for the production of methyl alcohol, may be obtained by activating the catalyst by means of a process described as "anodic oxidation." For example, the brass or bronze filings may be made to serve as the anode in an electrolytic cell. Nickel or carbon may be used as the cathode, and a 2% solution of sodium carbonate is a suitable electrolyte. For example, if a cell is constructed in which 30 pounds of brass filings contained in a cylindrical column 30 inches high and 4-5 inches in diameter and located 2-4 inches from a cathode of about equal size, are exposed to a current of 10 volts and 30-50 amperes for about 30 hours, there will result an anodic oxidation of the entire surface to a sufficient depth to form an active catalyst.

This anodic oxidation results in a surface change on the metal and the formation of a penetrable film of oxides. If this catalyst mass is now partially reduced to metallic state by heating it in a current of hydrogen, a very active methyl alcohol catalyst will result. We prefer to reduce the mass immediately prior to methanol production by passing hydrogen over it at a temperature of about 200° C.

While we have described in detail the anodic oxidation method of activating a copper alloy to serve as a catalyst for methyl alcohol production it should be understood that these catalysts may be oxidized by other means, such as exposure to an atmosphere of oxygen at an elevated temperature. The anodic oxidation method produces a better product, but our invention is not so limited, and refers broadly to the preparation and activation of copper alloy catalysts suitable for methyl alcohol synthesis.

When carbon monoxide gas in the presence of a molecular excess of hydrogen is passed over one of our copper-alloy catalysts at elevated temperature and pressure, methyl alcohol is produced in substantially pure form. Pressures in excess of 100 atmospheres and temperatures in excess of 200° C. should be employed. The reaction temperature—i. e., of the catalyst mass—should not exceed 600° C. There is no definite upper limit of pressure except the practical limit which can be attained by apparatus available.

At pressures and temperatures within the range described, methanol will be produced in every case by the use of our copper alloy catalysts. The yield will vary with the pressure, temperature, and rate of gas flow over the catalyst. In general, we prefer to use pressures between 100–200 atmospheres and a temperature of 250–300° C.

Where pure carbon monoxide gas is used, we prefer to use an excess of hydrogen in the relation of one molecule of carbon monoxide to five molecules of hydrogen. A gaseous mixture of carbon monoxide with carbon dioxide or pure carbon dioxide gas may be also employed, but in this case more hydrogen must be used as some is consumed in producing water according to the reaction

$$CO_2 + 3H_2 = CH_3OH + H_2O$$

In the case where a substantial quantity of the oxide of carbon employed is carbon dioxide, we prefer to use a much larger excess of hydrogen—for example, twenty molecules of hydrogen per molecule of carbon dioxide.

When a mixture of carbon monoxide and hydrogen, in the proportion of one volume of the former to five of the latter, is passed over our copper-alloy catalyst at a pressure of 200 atmospheres and a temperature of 280° C. at a speed of about 10 cubic meters of gas per kilogram of catalyst, about 15% of the carbon monoxide present is converted to methyl alcohol, which, on cooling the gaseous mixture, is condensed to liquid form and thus removed from the process. The residual gas mixture is continually recirculated over the catalyst and from time to time carbon monoxide and hydrogen is added to maintain approximately the original percentage composition of gases.

While we have described the use of pure carbon oxides and hydrogen as the raw materials for methyl alcohol production, it should be understood that small percentages of gaseous hydrocarbons such as methane and inert gases such as nitrogen may be present in the gaseous mixture without bad results.

This application is a division of our copending application Serial No. 52,956, filed August 27, 1925.

Now having fully described our invention, we claim the following as new and novel.

1. A methanol catalyst which comprises a copper-zinc alloy in which the copper predominates, the surface of which comprises the partially reduced oxides of the alloy surface.

2. A methanol catalyst which comprises filings of a copper-zinc alloy in which the copper predominates, the surface of which comprises the partially reduced oxides of the alloy surface.

3. A methanol catalyst which comprises a copper-zinc alloy in which the copper predominates, the surface of which comprises the partially reduced oxides of the anodically oxidized alloy surface.

4. A methanol catalyst which comprises filings of a copper-zinc alloy in which the copper predominates, the surface of which comprises the partially reduced oxides of the anodically oxidized alloy surface.

In testimony whereof, we have signed our names to this specification this 13th day of September and this 11th day of September, 1928.

CHARLES L. GABRIEL.
BRUCE K. BROWN.